United States Patent
Chattopadhyay et al.

(10) Patent No.: US 12,348,486 B2
(45) Date of Patent: *Jul. 1, 2025

(54) RANDOMIZED SPI FOR DISTRIBUTED IPsec

(71) Applicant: Parallel Wireless, Inc., Nashua, NH (US)

(72) Inventors: Ayan Chattopadhyay, Bangalore (IN); Vikram Menon, Bangalore (IN)

(73) Assignee: Parallel Wireless, Inc., Nashua, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/610,074

(22) Filed: Mar. 19, 2024

(65) Prior Publication Data
US 2024/0236042 A1 Jul. 11, 2024

Related U.S. Application Data

(63) Continuation of application No. 17/080,836, filed on Oct. 26, 2020, now Pat. No. 11,936,620.

(60) Provisional application No. 62/926,160, filed on Oct. 25, 2019.

(51) Int. Cl.
*H04L 9/40* (2022.01)
*H04L 9/06* (2006.01)

(52) U.S. Cl.
CPC ........ *H04L 63/0236* (2013.01); *H04L 9/0643* (2013.01); *H04L 63/029* (2013.01); *H04L 63/0485* (2013.01)

(58) Field of Classification Search
USPC .......................................... 726/13
See application file for complete search history.

(56) References Cited

U.S. PATENT DOCUMENTS

| | | | |
|---|---|---|---|
| 7,181,612 B1 * | 2/2007 | Pellacuru | H04L 63/0272 713/153 |
| 9,356,912 B2 * | 5/2016 | Hu | H04L 47/125 |
| 2007/0133467 A1 * | 6/2007 | Hsu | H04W 36/0033 370/331 |
| 2017/0374025 A1 * | 12/2017 | Pan | H04L 63/164 |
| 2019/0166109 A1 * | 5/2019 | Wang | H04L 9/0838 |

* cited by examiner

*Primary Examiner* — Sanchit K Sarker
(74) *Attorney, Agent, or Firm* — Michael Y. Saji

(57) ABSTRACT

A method and computer readable software for providing randomized Security Parameter Index (SPI) for distributed Internet Protocol security (IPsec) are disclosed. In one embodiment a method includes designating each IPsec node with a unique node identifier, the IPsec node; performing a hash function on a random SPI to provide a randomized SPI; and assigning the randomized SPI to an IPsec tunnel associated with an IPsec node.

13 Claims, 5 Drawing Sheets

RANDOMIZED SPI FOR DISTRIBUTED IPsec

CROSS-REFERENCE TO RELATED APPLICATIONS

This application is a continuation of U.S. application Ser. No. 17/080,836, filed Oct. 26, 2020, which claims priority under 35 U.S.C. § 119(c) to U.S. Provisional Pat. App. No. 62/926,160, filed Oct. 25, 2019, titled "Randomized SPI for Distributed IPsec", each of which is hereby incorporated by reference in its entirety for all purposes. This application also hereby incorporates by reference, for all purposes, each of the following U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

The Security Parameter Index (SPI) is an identification tag added to the header while using IPsec for tunneling the IP traffic. This tag helps the kernel discern between two traffic streams where different encryption rules and algorithms may be in use. For further reference, IETF RFC 2401 is incorporated by reference in its entirety.

A distributed IPsec system will consist of a load balancer and a group of IPsec subsystems acting as one single IPsec entity to the external world. Each tunnel will get distributed among one of the subsystems and the allocated SPI would have the correlation to the corresponding subsystem.

An IPsec subsystem is the main operation endpoint for one or many unique IPsec tunnels. Each tunnel is identified by a unique combination of IKE and IPsec SPIs. Since the tunnel security is dependent upon SPI construction, random and cryptographically difficult to guess SPI would ensure the proper security of the tunnel. All IKE/IPsec RFCs strongly advocate the association of random SPI with the IPsec tunnel.

SUMMARY

High Availability can be achieved by having an ACTIVE-STANDBY and/or ACTIVE-ACTIVE configured.

In our design, we have taken up ACTIVE-ACTIVE yet distributed IPsec system.

A method to generate randomized SPIs for a High Available distributed IPsec system is presented. The focus is to have the generated SPI secure/unpredictable and the distribution statistically uniform. This ensures IKE and IPsec tunnels will be distributed uniformly across all IPsec nodes and optimum performance in terms of IKE tunnel and throughput can be achieved.

In one embodiment a method for providing randomized Security Parameter Index (SPI) for distributed Internet Protocol security (IPsec) includes designating each IPsec node with a unique node identifier, the IPsec node; performing a hash function on a random SPI to provide a randomized SPI; and assigning the randomized SPI to an IPsec tunnel associated with an IPsec node.

In another embodiment, a computer readable medium includes instructions for providing randomized Security Parameter Index (SPI) for distributed Internet Protocol security (IPsec). The instructions include in instructions for designating each IPsec node with a unique node identifier, the IPsec node; performing a hash function on a random SPI to provide a randomized SPI; and assigning the randomized SPI to an IPsec tunnel associated with an IPsec node.

DETAILED DESCRIPTION

The standard SPI distribution methods are mainly based on:

SPI range partitioning (each sub range will map to an IPsec node).

Static SPI distribution (for e.g. monotonically increasing SPI).

Reserving fixed set of bits in SPI (the bit set maps to an IPsec node).

Load Balancer to get fixed range or specific value of SPI to map to IPsec node.

The above methods do not consider the security and unpredictability of SPI.

Solution to Problem

SPI Generation

Random SPI generation is based on random number generation and Openssl provides the framework of such. Linux XFRM kernel has also the random number generation support which would give 32 bit IPsec SPI.

To make the random SPI generation uniform over full SPI space (either 64 bit or 32 bit), hashing of random SPI would give the ideal result. The hash function is used SIPHASH which is fast in calculation for shorter input yet capable of providing the full and uniform distribution of SPI. Since the hash function mentioned above is collision resistant hash function, this ensures SPI level security.

Each IPsec node can be designated with unique node identifier. The node identifier is within the range of max configured IPsec node in one deployed session. Each unique SPI will then undergo the modulo operation with modulo max configured node (max_node). Since the result will fall to any node identifier within the range of 0 to max_node−1, the SPI will be distributed thus over the range of IPsec nodes.

Figure 1:
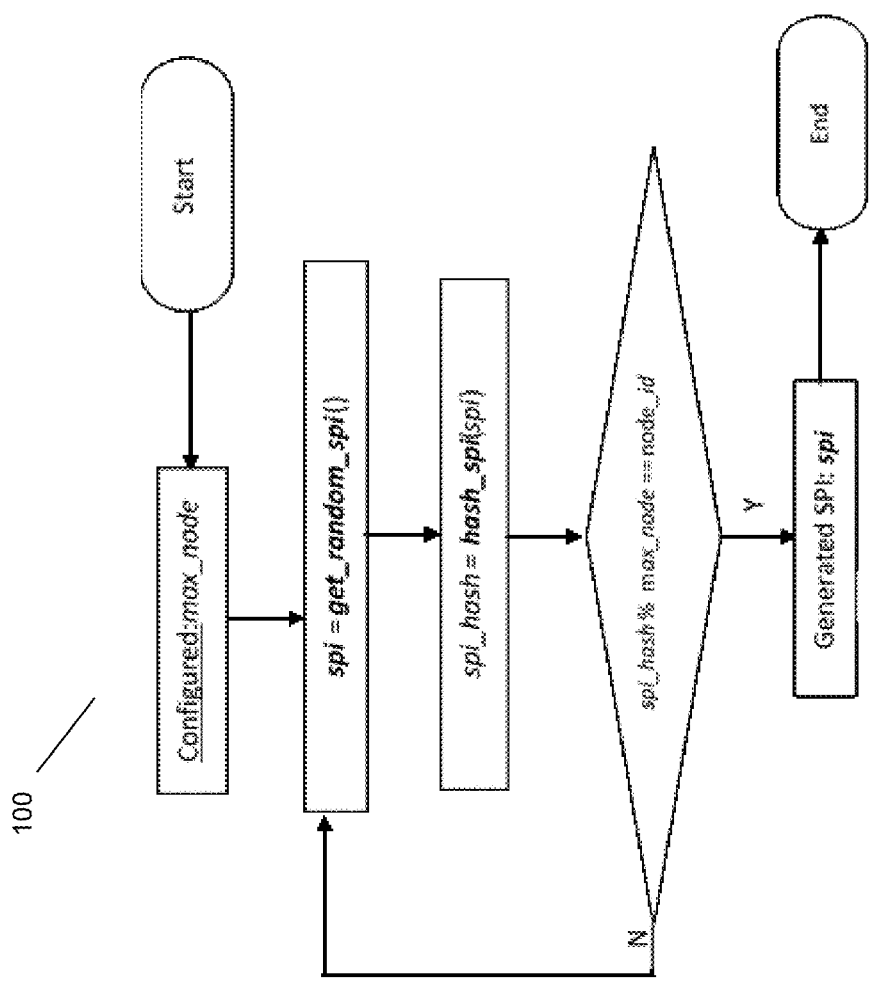
FIG. 1 is a flow diagram, in accordance with some embodiments.

Referring to FIG. 1, a flow diagram shows the steps in one embodiment 100 for providing randomized Security Parameter Index (SPI) for distributed Internet Protocol security (IPsec). The steps include designating each IPsec node with a unique node identifier, the IPsec node; performing a hash function on a random SPI to provide a randomized SPI; and assigning the randomized SPI to an IPsec tunnel associated with an IPsec node.

The nature of the distribution of SPI over IPsec nodes is dependent upon the SPI generation and uniform generation of randomized SPI ensures statistically uniform distribution of SPIs over IPsec nodes.

SPI Association to the Distributed HA IPsec Nodes

The IPsec subsystem in the distributed HA system can further be split into multiple IPsec virtual nodes, a logical unit that will be associated with a set of IPsec tunnels. The tunnels associated with a subsystem will be distributed among all the nodes.

The SPI generation method, described above, will create a correlation to a unique node. The load balancer first gets the node associated with the incoming IKE/IPsec packet, as explained below, followed by forwarding the packet to the IPsec node.

Allocate an IPsec node for first IKE_SA_INIT request.

For subsequent IKE and IPsec packets, extract the SPI and find the associated node as per the random SPI-node correlation logic.

Load balancer does not get any pre-computed SPI range or any specific value of SPI. In fact, load balancer only receives nondeterministic (unpredictable) SPI associated with a tunnel. Load balancer can only forward the packet to the specific IPsec node based on SPI generation and SPI correlation to node algorithm.

Figure 2:
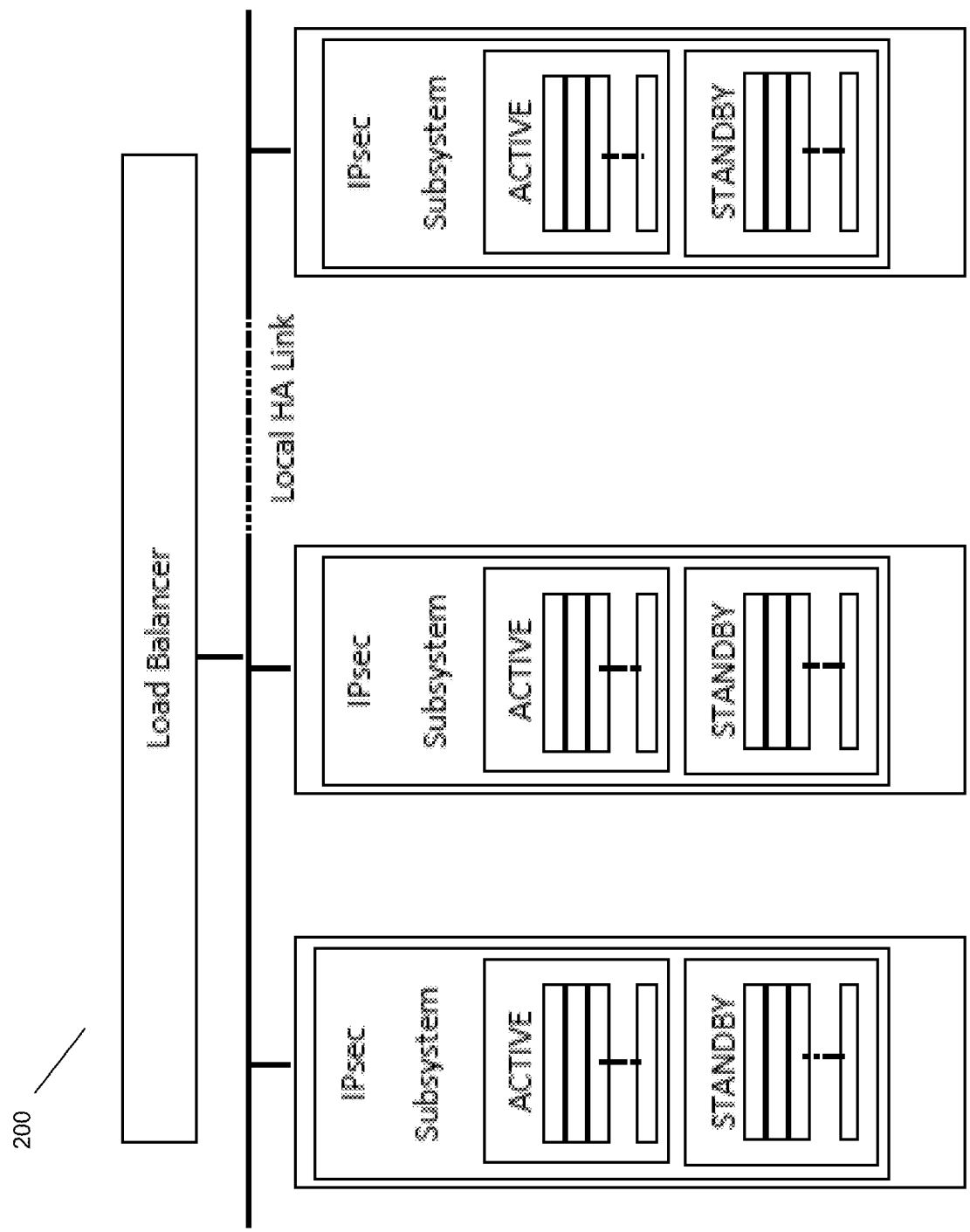
FIG. 2 is a block diagram of a system showing geographical redundancy, in accordance with some embodiments.

The redundancy support will be at the node level. FIG. 2 shows a high-level software architecture 200 highlighting the ACTIVE:ACTIVE redundancy. Hence, each subsystem will host a set of ACTIVE and STANDBY (backing up other nodes, corresponding to other IPsec subsystems, within the system) nodes.

A geographical redundancy, having an identical IPsec system to its peer as in the above diagram, will provide additional level of IPsec system availability.

The proposed SPI generation method brings in the both security and unpredictability aspects by randomizes generation logic and hashing, which is lacking in the standard methods (known published literatures).

The distributed IPsec HA system uses an indirect way of SPI to IPsec node association, which makes the mapping non-trivial to the external entity.

Load balancer does not need to know/store any precomputed deterministic SPI range or specific SPI value, rather load balancer is given unpredictable SPI only to compute the destination IPsec node.

This algorithm of generating SPI and associating with IPsec nodes is completely secure. The following arguments establish the security claim:

SPI is random generated number over SPI space. Since random generation logic is secure and no known efficient algorithm to guess the SPI a priori, this ensures security.

In addition, the generated SPI is hashed with known hash collision resistant algorithm, ensures security.

The secured SPIs are statistically uniformly distributed over configured nodes, so tunnels contain in IPsec nodes would remain secured as well.

SPI generation is only limited by SPI space which is either 64 bit or 32 bit.

Figure 3:
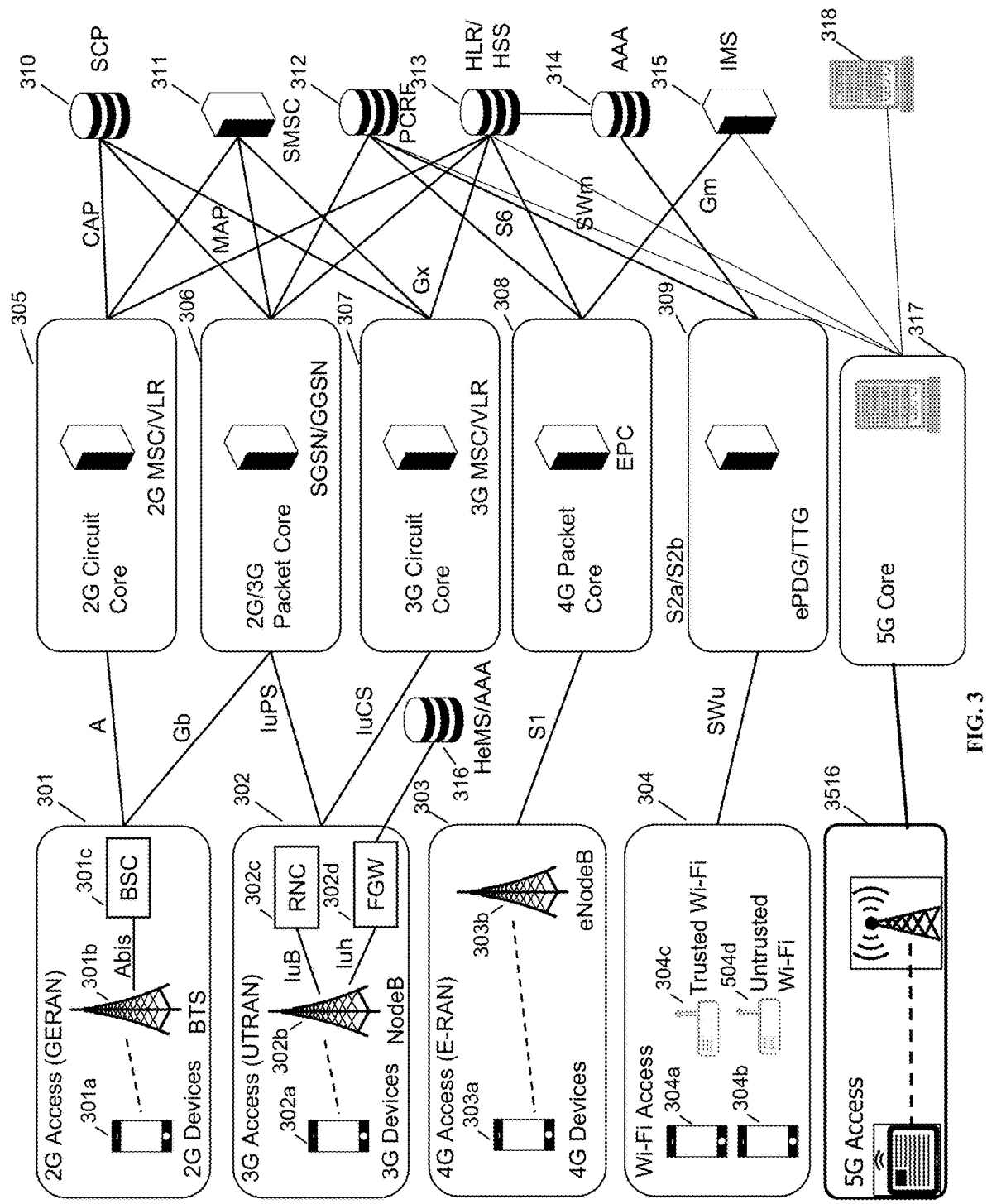
FIG. 3 is a schematic network architecture diagram for various radio access technology core networks.

FIG. 3 is a schematic network architecture diagram for 3G and other-G prior art networks. The diagram shows a plurality of "Gs," including 2G, 3G, 4G, 5G and Wi-Fi. 2G is represented by GERAN 301, which includes a 2G device 301a, BTS 301b, and BSC 301c. 3G is represented by UTRAN 302, which includes a 3G UE 302a, nodeB 302b, RNC 302c, and femto gateway (FGW, which in 3GPP namespace is also known as a Home nodeB Gateway or HNBGW) 302d. 4G is represented by EUTRAN or E-RAN 303, which includes an LTE UE 303a and LTE eNodeB 303b. Wi-Fi is represented by Wi-Fi access network 304, which includes a trusted Wi-Fi access point 304c and an untrusted Wi-Fi access point 304d. The Wi-Fi devices 304a and 304b may access either AP 304c or 304d. In the current network architecture, each "G" has a core network. 2G circuit core network 305 includes a 2G MSC/VLR; 2G/3G packet core network 306 includes an SGSN/GGSN (for EDGE or UMTS packet traffic); 3G circuit core 307 includes a 3G MSC/VLR; 4G circuit core 308 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 330, the SMSC 331, PCRF 332, HLR/HSS 333, Authentication, Authorization, and Accounting server (AAA) 334, and IP Multimedia Subsystem (IMS) 335. An HeMS/AAA 336 is present in some cases for use by the 3G UTRAN. The diagram is used to indicate schematically the basic functions of each network as known to one of skill in the art, and is not intended to be exhaustive. For example, 5G core 317 is shown using a single interface to 5G access 316, although in some cases 5G access can be supported using dual connectivity or via a non-standalone deployment architecture.

Noteworthy is that the RANs 301, 302, 303, 304 and 336 rely on specialized core networks 305, 306, 307, 308, 309, 337 but share essential management databases 330, 331, 332, 333, 334, 335, 338. More specifically, for the 2G GERAN, a BSC 301c is required for Abis compatibility with BTS 301b, while for the 3G UTRAN, an RNC 302c is required for Iub compatibility and an FGW 302d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 4:
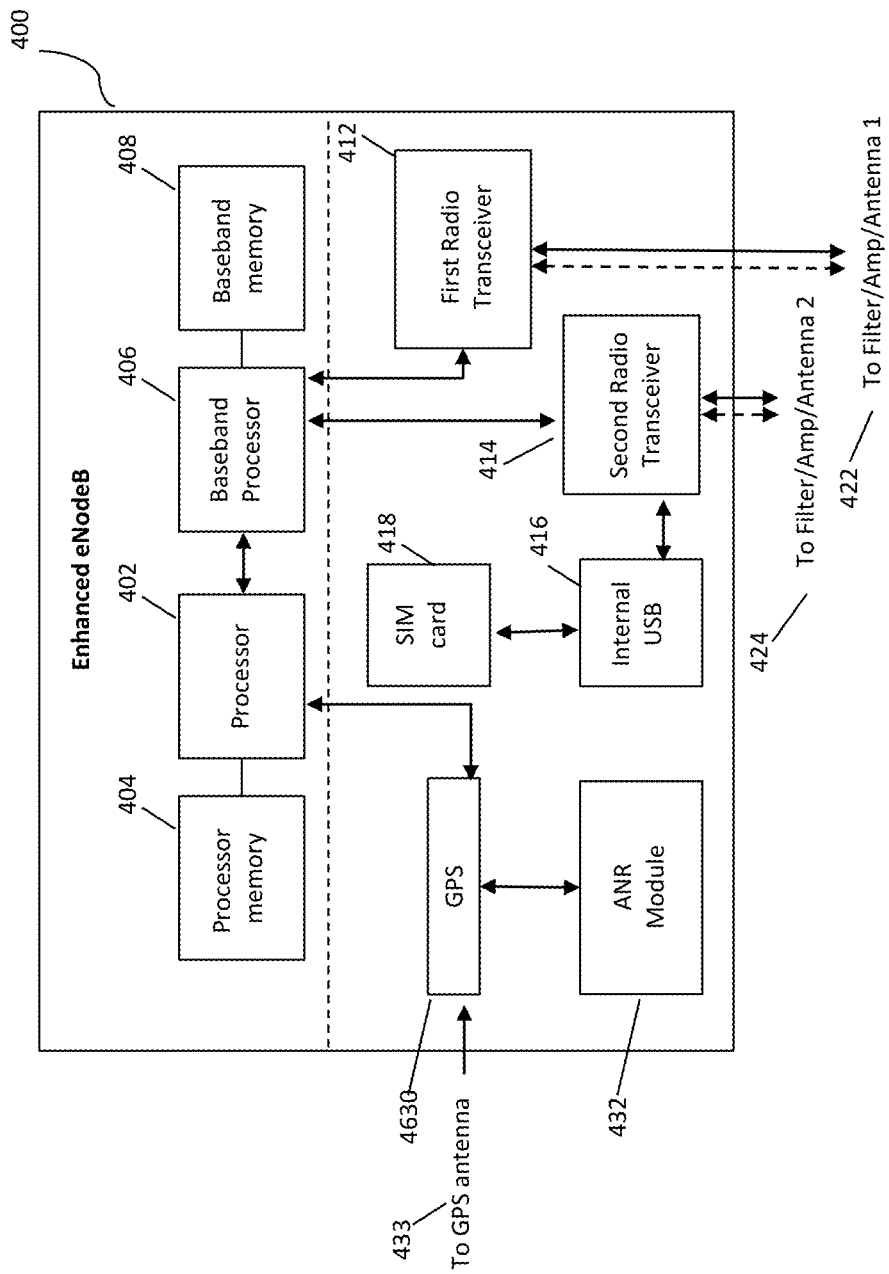
FIG. 4 is an enhanced eNodeB for performing the methods described herein, in accordance with some embodiments.

FIG. 4 is an enhanced eNodeB for performing the methods described herein, in accordance with some embodiments. eNodeB 500 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber information module card (SIM card) 418 coupled to USB port 416. In some embodiments, the second radio transceiver 414 itself may be coupled to USB port 416, and communications from the baseband processor may be passed through USB port 416. The second radio transceiver may be used for wirelessly backhauling eNodeB 400.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

A GPS module 430 may also be included, and may be in communication with a GPS antenna 432 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 432 may also be present and may run on processor 402 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 5:
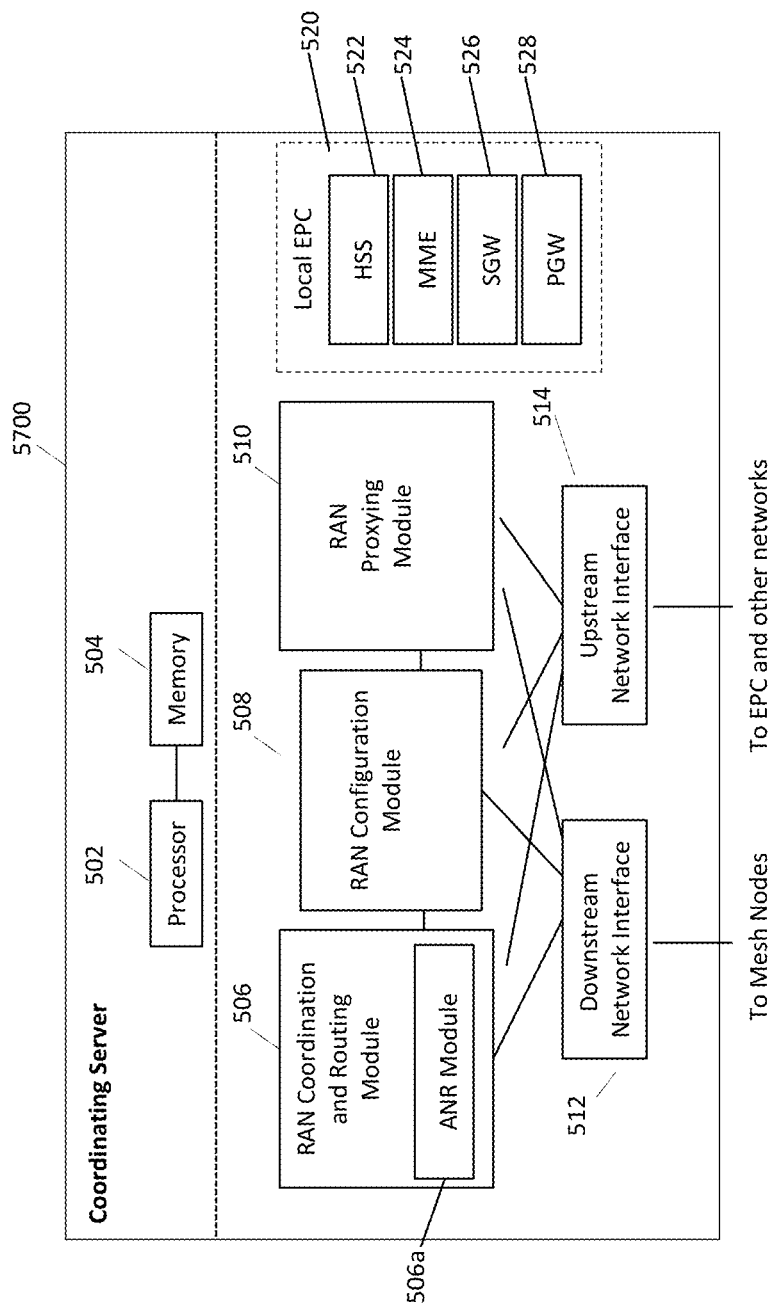
FIG. 5 is a coordinating server for providing services and performing methods as described herein, in accordance with some embodiments.

FIG. 5 is a coordinating server for providing services and performing methods as described herein, in accordance with some embodiments. Coordinating server 500 includes processor 502 and memory 504, which are configured to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing randomized Security Parameter Index (SPI) for distributed Internet Protocol security (IPsec) in a cellular telecommunications network, comprising:
   designating each IPsec node with a unique node identifier;
   performing a hash function on a random SPI to provide a randomized SPI, wherein the random SPI is a generated number over SPI space, the random SPI having a length corresponding to a full space available for use by the SPI space, and wherein the hashing is performed using a hash collision resistant algorithm;
   assigning the randomized SPI to an IPsec tunnel associated with the each IPsec node;
   splitting an IPsec subsystem into multiple IPsec virtual nodes, each of the multiple IPsec virtual node being a logical unit that will be associated with a set of IPsec tunnels, and
   distributing tunnels associated with the split IPsec subsystem among the multiple IPsec virtual nodes,
   wherein the multiple IPsec virtual nodes are thereby configured to act in a failover configuration in a cellular telecommunications network.

2. The method of claim 1, further comprising assigning to a load balancer an IPsec node associated with the incoming IPsec packet, then forwarding the packet to the assigned IPsec node.

3. The method of claim 1, further comprising generating the randomized SPI uniformly for statistically uniform distribution of SPIs over IPsec nodes.

4. The method of claim 1, wherein a plurality of the IPsec nodes are eNodeBs in a Long Term Evolution (LTE) telecommunications network, and wherein the IPsec tunnels provide traffic security between the eNodeBs and an LTE core network.

5. The method of claim 1, further comprising using a modulo operation on the randomized SPI to designate the unique node identifier.

6. The method of claim 1, further comprising, at an IPsec terminating node, assigning the randomized SPI to the IPsec tunnel associated with the each IPsec node.

7. The method of claim 1, further comprising, at an IPsec terminating node, splitting the IPsec subsystem into multiple IPsec virtual nodes each associated with a set of IPsec tunnels with a random SPI generated using random numbers having lengths equal to the full space available for use by the SPI space.

8. The method of claim 1, wherein a first IPsec terminating node and a second IPsec terminating node are nodes in a Long Term Evolution (LTE) telecommunications network.

9. A non-transitory computer-readable medium containing instructions for randomized Security Parameter Index (SPI) for distributed Internet Protocol security (IPsec), which, when executed, cause a system to perform steps comprising:
   designating each IPsec node with a unique node identifier;
   performing a hash function on a random SPI to provide a randomized SPI wherein the random SPI is a generated number over SPI space, the random SPI having a length corresponding to a full space available for use by the SPI space, and wherein the hashing is performed using a hash collision resistant algorithm;
   assigning the randomized SPI to an IPsec tunnel associated with the each IPsec node;
   splitting an IPsec subsystem into multiple IPsec virtual nodes, each of the multiple IPsec virtual node being a logical unit that will be associated with a set of IPsec tunnels, and
   distributing tunnels associated with the split IPsec subsystem among the multiple IPsec virtual nodes,
   wherein the multiple IPsec virtual nodes are thereby configured to act in a failover configuration in a cellular telecommunications network.

10. The computer-readable medium of claim 9, the steps further comprising assigning to a load balancer a node associated with the incoming IPsec packet, then forwarding the packet to the IPsec node.

11. The computer-readable medium of claim 9, wherein a plurality of the IPsec nodes are eNodeBs in a Long Term Evolution (LTE) telecommunications network, and wherein the IPsec tunnels provide traffic security between the eNodeBs and an LTE core network.

12. The computer-readable medium of claim 9, the steps further comprising using a modulo operation on the randomized SPI to designate the unique node identifier.

13. The computer-readable medium of claim 9, the steps further comprising generating the randomized SPI uniformly to ensure statistically uniform distribution of SPIs over IPsec nodes.

* * * * *